(12) United States Patent
Raab et al.

(10) Patent No.: US 8,997,709 B2
(45) Date of Patent: Apr. 7, 2015

(54) MASS EQUALIZATION GEAR MECHANISM OF AN INTERNAL COMBUSTION ENGINE

(75) Inventors: Robin Raab, Schwabach (DE); Siegfried Tisch, Gerlingen (DE); Peter Solfrank, Frensdorf (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/117,729

(22) PCT Filed: Apr. 18, 2012

(86) PCT No.: PCT/EP2012/057027
§ 371 (c)(1),
(2), (4) Date: Nov. 14, 2013

(87) PCT Pub. No.: WO2012/156168
PCT Pub. Date: Nov. 22, 2012

(65) Prior Publication Data
US 2014/0109860 A1 Apr. 24, 2014

(30) Foreign Application Priority Data
May 16, 2011 (DE) .......................... 10 2011 075 897

(51) Int. Cl.
*F16F 7/10* (2006.01)
*F16F 15/26* (2006.01)

(52) U.S. Cl.
CPC ................ *F16F 7/10* (2013.01); *F16F 15/267* (2013.01)

(58) Field of Classification Search
CPC .................................. F16F 7/10; F16F 15/267
USPC ........ 123/192.2, 192.1, 196 R, 195 C, 198 E; 74/603, 604

See application file for complete search history.

(56) References Cited

U.S. PATENT DOCUMENTS

| 2,914,963 | A | | 12/1959 | Scherenberg | |
| 4,509,474 | A | * | 4/1985 | Schmuck | 123/192.2 |
| 4,677,948 | A | * | 7/1987 | Candea | 123/192.2 |
| 4,703,725 | A | * | 11/1987 | Weertman | 123/192.2 |
| 6,758,183 | B2 | * | 7/2004 | Endo et al. | 123/192.2 |
| 6,971,361 | B2 | * | 12/2005 | Lawrence | 123/192.2 |
| 7,017,545 | B2 | * | 3/2006 | Sato et al. | 123/192.2 |
| 2006/0207542 | A1 | * | 9/2006 | Takano | 123/192.2 |
| 2009/0308344 | A1 | | 12/2009 | Ihlemann et al. | |

FOREIGN PATENT DOCUMENTS

| EP | 1703093 | 9/2006 |
| EP | 2199644 | 6/2010 |
| WO | 2008009551 | 1/2008 |

* cited by examiner

*Primary Examiner* — Noah Kamen
*Assistant Examiner* — Grant Moubry
(74) *Attorney, Agent, or Firm* — Volpe and Koenig, P.C.

(57) ABSTRACT

A mass equalization gear mechanism of an internal combustion engine is provided, having a gear mechanism housing (8) with bearing points (16, 17, 18), at least one equalization shaft (6) with a drive section (9) and an imbalance section (12) and rolling bearings (10, 11, 15) by which the equalization shaft is mounted in the bearing points. In this context, the gear mechanism housing is hydraulically sealed, with the result that the imbalance section and at least one of the rolling bearings is hydraulically separated from the drive section and is provided with autonomous lubrication.

4 Claims, 1 Drawing Sheet

MASS EQUALIZATION GEAR MECHANISM OF AN INTERNAL COMBUSTION ENGINE

The invention relates to a mass equalization gear mechanism for balancing free inertial forces and/or free inertial moments of an internal combustion engine. The mass equalization gear mechanism comprises a gearbox housing with bearing points, at least one balancing shaft with a drive section, and an imbalance section and rolling bearings by means of which the balancing shaft is supported at the bearing points.

BACKGROUND

An internal combustion engine with a mass equalization gear mechanism according to the class is known from U.S. Pat. No. 2,914,963. The mass equalization gear mechanism that is arranged underneath the crankshaft as a so-called Lancaster balancing device with two balancing shafts rotating in opposite directions at twice the rotational speed of the crankshaft simultaneously comprises the pump of the lubricating oil circuit of the internal combustion engine, in that the intermeshing drive gearwheels of the balancing shafts form a gear type pump. Their task also consists in keeping the gearbox housing oil-free in the area of the chain drive of the balancing shafts, in order to counteract oil foaming due to the rotating chain wheel. The end sections of the balancing shafts are supported in the gearbox housing by means of rolling bearings connected to the lubricating oil circuit.

SUMMARY

The present invention is based on the objective of improving a mass equalization gear mechanism of the type named in the introduction with respect to the rolling bearing lubrication.

The solution to this objective is provided by one or more features of the invention, while advantageous refinements and constructions of the invention are described below and in the claims. Accordingly, the gearbox housing should be sealed hydraulically such that the imbalance section and at least one of the rolling bearings are separated hydraulically relative to the drive section and provided with autonomous lubrication. The at least partial lubricating oil isolation of the balancing mechanism from the oil circuit of the internal combustion engine has the primary effect that the lubricating oil circulating only in the balancing mechanism is not exposed to any contamination due to combustion residues, such as, e.g., abrasive soot particles or increased water portions as a consequence of combustion of ethanol-containing fuels. This leads to a significant increase in service life of the rolling bearing or bearings supplied by the autonomous lubrication.

The separated lubrication according to the invention is suitable, in particular, for balancing mechanisms that are arranged within the oil pan of the internal combustion engine, wherein then the axis of the balancing shaft runs geodetically underneath the nominal oil circuit operating level of the internal combustion engine and above the nominal oil level of the autonomous lubrication. The term "nominal oil level" is to be understood to be the oil fill level at rest for the prescribed filling amount. In this construction, the oil fill level within the sealed gearbox housing is dimensioned so that the height of the fill level, on one hand, guarantees sufficient lubricating relationships at the autonomously lubricated rolling bearings, but, on the other hand, leads to lowest possible splash losses/ oil foaming at the balancing shaft immersed at this location. This is especially of interest in modern internal combustion engines with a start-stop function, because then, for (repeated) starting processes of the internal combustion engine, a low displacement of the lubricating oil from the peripheral area of the imbalance section of the balancing shaft is required in all cases. The minimally foamed lubricating oil is likewise advantageous for the lubricating relationships at the autonomously lubricated rolling bearings.

For the benefit of further improved lubricating relationships, for the autonomous lubrication on one hand and the oil circuit of the internal combustion engine on the other hand, lubricating oils are provided with different properties. The lubricating oil provided for the autonomous lubrication is preferably a rolling bearing oil that is primarily adapted to the requirements of the rolling bearing lubrication and would therefore not be suitable for the oil circuit of the internal combustion engine.

BRIEF DESCRIPTION OF THE DRAWINGS

Additional features of the invention are given from the following description and from the drawings in which an embodiment of a balancing mechanism according to the invention is shown. If not mentioned otherwise, features or components that are identical or have identical functions are provided with identical reference symbols. Shown are.

DETAILED DESCRIPTION OF THE PREFERRED EMBODIMENTS

Figure 2:
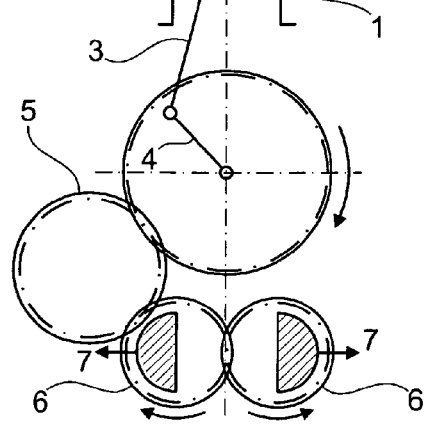
FIG. 2 the gearbox schematic of a known balancing mechanism constructed as a Lancaster balancing device.

For better understanding, the invention will be explained starting with FIG. 2 in which a mass equalization gear mechanism, also known as a Lancaster balancing device, in a reciprocating piston internal combustion engine with a four-cylinder, in-line construction is shown schematically. The internal combustion engine comprises the pistons 2 oscillating in the cylinders 1. The longitudinal motion of these pistons is converted by means of the connecting rod 3 into the rotation of the crankshaft 4. This crankshaft drives—here via an intermediate shaft 5—two balancing shafts 6 with imbalances 7, wherein the balancing shafts 6 rotate parallel to the crankshaft 4 at twice the rotational speed of the crankshaft. In the present case of the four-cylinder engine, the balancing mechanism is used to equalize the free second-order inertial forces.

Figure 1:
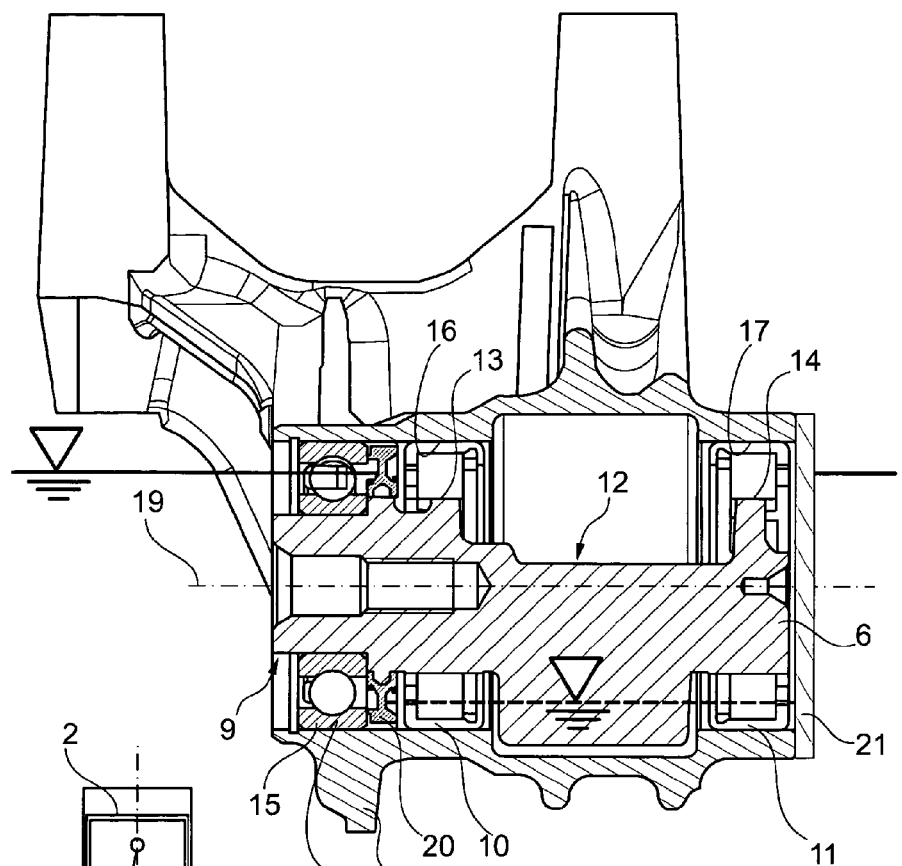
FIG. 1 a part of the balancing mechanism in longitudinal section.

FIG. 1 shows a part of a balancing mechanism according to the invention that is essential for the understanding of the invention in longitudinal section through a gearbox housing 8. This is likewise a Lancaster balancing device of which, however, only one of the otherwise structurally identical balancing shafts 6 is shown. Also not shown is the drive wheel screwed to a drive section 9 of the balancing shaft 6 in the form of a spur gear meshing with the crankshaft of the internal combustion engine. The radial bearing of the balancing shaft 6 is realized by means of rolling bearings 10 and 11 that roll without an inner ring, i.e., directly, on journals 13 and 14 bordering both sides of an imbalance section 12. The axial support is realized by means of a ball bearing 15 that is mounted on the drive section 9. The two radial bearings 10, 11 and the axial bearings 15 are themselves supported at corresponding bearing points 16 and 17 and 18, respectively, of the gearbox housing 8.

The balancing mechanism is located within the (not-shown) oil pan of the internal combustion engine, wherein the nominal oil level of its oil circuit runs at the height of the solid line according to the fill level symbol above the shaft axis 19. A shaft sealing ring 20 inserted between the ball bearing 15 and the drive-side rolling bearing 10 provides, in connection with a rear housing cover 21 that the housing space in-between is sealed hydraulically relative to the surroundings, i.e., relative to the oil pan. This housing space is filled with an autonomous, pressure-less lubrication in the form of a rolling bearing oil optimized to the tribological relationships at the rolling bearings 10, 11. The nominal oil level of the rolling bearing oil is dimensioned so that it guarantees, for the smallest possible splash losses due to the rotating imbalance section 12, a sufficient lubricant supply to the two rolling bearings 10 and 11. According to the associated fill level symbol of the autonomous lubrication, its oil level is at the height of the dashed line and thus runs significantly below the shaft axis 19.

LIST OF REFERENCE SYMBOLS

1 Cylinder
2 Piston
3 Connecting rod
4 Crankshaft
5 Intermediate shaft
6 Balancing shaft
7 Imbalance
8 Gearbox housing
9 Drive section
10 Rolling bearing/radial bearing
11 Rolling bearing/radial bearing
12 Imbalance section
13 Journal
14 Journal
15 Ball bearing/axial bearing
16 Bearing point
17 Bearing point
18 Bearing point
19 Axis of the balancing shaft
20 Shaft sealing ring
21 Housing cover

The invention claimed is:

1. A mass equalization gear mechanism of an internal combustion engine comprising a gearbox housing with bearing points, at least one balancing shaft with a drive section and an imbalance section, and rolling bearings by which the balancing shaft is supported at the bearing points, the gearbox housing is sealed hydraulically such that the imbalance section and at least one of the rolling bearings are separated hydraulically relative to the drive section and are provided with autonomous lubrication, the mass equalization gear mechanism is arranged within an oil pan of the internal combustion engine, an axis of the balancing shaft runs geodetically underneath a nominal oil circuit operating level of the internal combustion engine in a rest state thereof and above a nominal oil level of the autonomous lubrication when the engine is in the rest state.

2. The mass equalization gear mechanism according to claim 1, wherein lubricating oils with different properties are provided for the autonomous lubrication and an oil circuit of the internal combustion engine.

3. The mass equalization gear mechanism according to claim 2, wherein the lubricating oil provided for the autonomous lubrication is a rolling bearing oil.

4. The mass equalization gear mechanism according to claim 1, wherein the balancing shaft is supported by radial bearings arranged on two sides of the imbalance section and an axial bearing arranged on a side of the drive section at the corresponding bearing points of the gearbox housing, a shaft sealing ring located between the axial bearing and the drive-side radial bearing hydraulically seals the gearbox housing.

* * * * *